US011528657B1

(12) United States Patent
Mangalvedhe et al.

(10) Patent No.: US 11,528,657 B1
(45) Date of Patent: Dec. 13, 2022

(54) INTELLIGENT REFLECTING SURFACE CONFIGURATION

(71) Applicant: Nokia Technologies Oy, Espoo (FI)

(72) Inventors: Nitin Mangalvedhe, Hoffman Estates, IL (US); Frederick Vook, Schaumburg, IL (US); Qiping Zhu, Wheaton, IL (US); William Hillery, Lafayette, IN (US); Jun Tan, Glenview, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/351,914

(22) Filed: Jun. 18, 2021

(51) Int. Cl.
*H04W 16/28* (2009.01)
*H04W 48/16* (2009.01)
*H04W 74/08* (2009.01)

(52) U.S. Cl.
CPC ........... *H04W 48/16* (2013.01); *H04W 16/28* (2013.01); *H04W 74/0833* (2013.01)

(58) Field of Classification Search
CPC ................. H04W 48/16; H04W 16/28; H04W 74/0833
See application file for complete search history.

(56) References Cited

U.S. PATENT DOCUMENTS

| 10,979,979 | B1* | 4/2021 | Kong | ................ | H04W 52/0261 |
| 2009/0034589 | A1* | 2/2009 | Hahm | ................ | H04B 1/7075 |
| | | | | | 375/150 |
| 2019/0110314 | A1 | 4/2019 | Abedini et al. | | |
| 2019/0199412 | A1 | 6/2019 | Koskela et al. | | |
| 2019/0319686 | A1* | 10/2019 | Chen, IV | ............ | H04W 72/046 |
| 2020/0053674 | A1* | 2/2020 | Wei | ..................... | H04W 56/001 |
| 2021/0051708 | A1 | 2/2021 | Agiwal et al. | | |

(Continued)

FOREIGN PATENT DOCUMENTS

| WO | 2012/104425 A1 | 8/2012 |
| WO | 2021/067784 A1 | 4/2021 |
| WO | 2021/101668 A1 | 5/2021 |

OTHER PUBLICATIONS

Pan et al., "Multicell MIMO Communications Relying on Intelligent Reflecting Surfaces", IEEE Transactions on Wireless Communications, vol. 19, No. 8, Aug. 2020, pp. 1-18.

(Continued)

*Primary Examiner* — Kenneth T Lam
(74) *Attorney, Agent, or Firm* — Squire Patton Boggs (US) LLP

(57) ABSTRACT

Systems, methods, apparatuses, and computer program products for intelligent reflecting surface configuration. The method may include scanning for synchronization signal blocks and reflection surface synchronization signal blocks during a cell search at a frequency on a synchronization raster. The method may also include determining whether a synchronization signal block or a reflection surface synchronization signal block is detected as a result of the scanning. The method may further include selecting a detected synchronization signal block or a detected reflection synchronization signal block based on a measurement metric of the detected synchronization signal block and the detected reflection synchronization signal block. In addition, the method may include performing an access procedure with a network element using the selected synchronization signal block or the selected reflection synchronization signal block.

17 Claims, 11 Drawing Sheets

(56) References Cited

U.S. PATENT DOCUMENTS

| | | | |
|---|---|---|---|
| 2021/0329512 A1* | 10/2021 | Jassal | H04W 36/08 |
| 2021/0337617 A1* | 10/2021 | Bao | H04W 76/18 |
| 2021/0360545 A1* | 11/2021 | Sköld | H04J 11/0073 |
| 2022/0038324 A1* | 2/2022 | Cesares Cano | H04L 27/2663 |
| 2022/0085906 A1* | 3/2022 | Lovlekar | H04L 5/0092 |
| 2022/0109490 A1* | 4/2022 | Ma | H04B 7/088 |
| 2022/0109492 A1* | 4/2022 | Abedini | H04B 7/0639 |
| 2022/0116821 A1* | 4/2022 | Wei | H04L 5/0048 |

OTHER PUBLICATIONS

Wu et al., "Intelligent Reflecting Surface Enhanced Wireless Network: Joint Active and Passive Beamforming Design", IEEE Global Communications Conference (GLOBECOM), Dec. 9-13, 2018, 6 pages.

Mohamed et al., "Leveraging UAVs with Intelligent Reflecting Surfaces for Energy-Efficient Communications with Cell-Edge Users", IEEE International Conference on Communications Workshops (ICC Workshops), Jun. 7-11, 2020, 6 pages.

"3rd Generation Partnership Project; Technical Specification Group Radio Access Network; NR; Physical layer procedures for control (Release 16)", 3GPP TS 38.213, V16.3.0, Sep. 2020, pp. 1-179.

"3rd Generation Partnership Project; Technical Specification Group Radio Access Network; NR; Physical layer measurements (Release 16)", 3GPP TS 38.215, V16.3.0, Sep. 2020, pp. 1-25.

Zheng et al., "Intelligent reflecting surface-enhanced OFDM: Channel estimation and reflection optimization", IEEE Wireless Communications Letters, vol. 9, No. 4, Apr. 2020, pp. 518-522.

You et al., "Channel estimation and passive beamforming for intelligent reflecting surface: Discrete phase shift and progressive refinement", IEEE Journal on Selected Areas in Communications vol. 38, No. 11, Nov. 2020, pp. 2604-2620.

"3rd Generation Partnership Project; Technical Specification Group Radio Access Network; NR; Physical channels and modulation (Release 16)", 3GPP TS 38.211 V16.3.0, Sep. 2020, pp. 1-133.

U.S. Appl. No. 17/352,000, "Initialization and Operation of Intelligent Reflecting Surface", filed Jun. 18, 2021, 50 pages.

Invitation to Pay Additional Fees corresponding to PCT International Patent Application No. PCT/EP2022/066128, dated Oct. 13, 2022.

Boyu Ning et al., "Channel Estimation and Hybrid Beamforming for Reconfigurable Intelligent Surfaces Assisted THz Communications", arxiv.org, Cornell University Library, 201 Olin Library Cornell University Thaca, NY 14853, Dec. 25, 2019, XP081566211, pp. 1-16.

* cited by examiner

INTELLIGENT REFLECTING SURFACE CONFIGURATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for intelligent reflecting surface configuration.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include scanning for synchronization signal blocks and reflection surface synchronization signal blocks during a cell search at a frequency on a synchronization raster. The method may also include determining whether a synchronization signal block or a reflection surface synchronization signal block is detected as a result of the scanning. The method may further include selecting a detected synchronization signal block or a detected reflection synchronization signal block based on a measurement metric of the detected synchronization signal block and the detected reflection synchronization signal block. In addition, the method may include performing an access procedure with a network element using the selected synchronization signal block or the selected reflection synchronization signal block.

Other example embodiments may be directed to an apparatus. The apparatus may include at least one processor and at least one memory including computer program code. The at least one memory and computer program code may also be configured to, with the at least one processor, cause the apparatus at least to scan for synchronization signal blocks and reflection surface synchronization signal blocks during a cell search at a frequency on a synchronization raster. The apparatus may also be caused to determine whether a synchronization signal block or a reflection surface synchronization signal block is detected as a result of the scanning. The apparatus may further be caused to select a detected synchronization signal block or a detected reflection synchronization signal block based on a measurement metric of the detected synchronization signal block and the detected reflection synchronization signal block. In addition, the apparatus may be caused to perform an access procedure with a network element using the selected synchronization signal block or the selected reflection synchronization signal block.

Other example embodiments may be directed to an apparatus. The apparatus may include means for scanning for synchronization signal blocks and reflection surface synchronization signal blocks during a cell search at a frequency on a synchronization raster. The apparatus may also include means for determining whether a synchronization signal block or a reflection surface synchronization signal block is detected as a result of the scanning. The apparatus may further include means for selecting a detected synchronization signal block or a detected reflection synchronization signal block based on a measurement metric of the detected synchronization signal block and the detected reflection synchronization signal block. In addition, the apparatus may include means for performing an access procedure with a network element using the selected synchronization signal block or the selected reflection synchronization signal block.

In accordance with other example embodiments, a non-transitory computer readable medium may be encoded with instructions that may, when executed in hardware, perform a method. The method may include scanning for synchronization signal blocks and reflection surface synchronization signal blocks during a cell search at a frequency on a synchronization raster. The method may also include determining whether a synchronization signal block or a reflection surface synchronization signal block is detected as a result of the scanning. The method may further include selecting a detected synchronization signal block or a detected reflection synchronization signal block based on a measurement metric of the detected synchronization signal block and the detected reflection synchronization signal block. In addition, the method may include performing an access procedure with a network element using the selected synchronization signal block or the selected reflection synchronization signal block.

Other example embodiments may be directed to a computer program product that performs a method. The method may include scanning for synchronization signal blocks and reflection surface synchronization signal blocks during a cell search at a frequency on a synchronization raster. The method may also include determining whether a synchronization signal block or a reflection surface synchronization signal block is detected as a result of the scanning. The method may further include selecting a detected synchronization signal block or a detected reflection synchronization signal block based on a measurement metric of the detected synchronization signal block and the detected reflection synchronization signal block. In addition, the method may include performing an access procedure with a network element using the selected synchronization signal block or the selected reflection synchronization signal block.

Other example embodiments may be directed to an apparatus that may include circuitry configured to scan for synchronization signal blocks and reflection surface synchronization signal blocks during a cell search at a frequency on a synchronization raster. The apparatus may also include circuitry configured to determine whether a synchronization signal block or a reflection surface synchronization signal block is detected as a result of the scanning. The apparatus may further include circuitry configured to select a detected synchronization signal block or a detected reflection synchronization signal block based on a measurement metric of the detected synchronization signal block and the detected reflection synchronization signal block. In addition, the apparatus may include circuitry configured to perform an access procedure with a network element using the selected synchronization signal block or the selected reflection synchronization signal block.

Certain example embodiments may be directed to a method. The method may include scanning for a synchronization signal block and a reflection surface synchronization signal block during a cell search at a first frequency. The method may also include, when the synchronization signal block is detected, continuing to scan the first frequency for the reflection surface synchronization signal block. The method may further include when the reflection surface synchronization signal block is detected and not the synchronization signal block, scanning a second frequency for the synchronization signal block. In addition, the method may include selecting the detected synchronization signal block or the detected reflection synchronization signal block based on a measurement metric of the detected synchronization signal block and the detected reflection synchronization signal block. Further, the method may include performing an access procedure with a network element using the selected synchronization signal block or the selected reflection synchronization signal block.

Other example embodiments may be directed to an apparatus. The apparatus may include at least one processor and at least one memory including computer program code. The at least one memory and computer program code may be configured to, with the at least one processor, cause the apparatus at least to scan for a synchronization signal block and a reflection surface synchronization signal block during a cell search at a first frequency. The apparatus may also be caused to when the synchronization signal block is detected, continue to scan the first frequency for the reflection surface synchronization signal block. The apparatus may further be caused to when the reflection surface synchronization signal block is detected and not the synchronization signal block, scan a second frequency for the synchronization signal block. In addition, the apparatus may be caused to select the detected synchronization signal block or the detected reflection synchronization signal block based on a measurement metric of the detected synchronization signal block and the detected reflection synchronization signal block. Further, the apparatus may be caused to perform an access procedure with a network element using the selected synchronization signal block or the selected reflection synchronization signal block.

Other example embodiments may be directed to an apparatus. The apparatus may include means for scanning for a synchronization signal block and a reflection surface synchronization signal block during a cell search at a first frequency. The apparatus may also include means for, when the synchronization signal block is detected, continuing to scan the first frequency for the reflection surface synchronization signal block. The apparatus may further include means for, when the reflection surface synchronization signal block is detected and not the synchronization signal block, scanning a second frequency for the synchronization signal block. In addition, the apparatus may include means for selecting the detected synchronization signal block or the detected reflection synchronization signal block based on a measurement metric of the detected synchronization signal block and the detected reflection synchronization signal block. Further, the apparatus may include means for performing an access procedure with a network element using the selected synchronization signal block or the selected reflection synchronization signal block.

In accordance with other example embodiments, a non-transitory computer readable medium may be encoded with instructions that may, when executed in hardware, perform a method. The method may include scanning for a synchronization signal block and a reflection surface synchronization signal block during a cell search at a first frequency. The method may also include, when the synchronization signal block is detected, continuing to scan the first frequency for the reflection surface synchronization signal block. The method may further include when the reflection surface synchronization signal block is detected and not the synchronization signal block, scanning a second frequency for the synchronization signal block. In addition, the method may include selecting the detected synchronization signal block or the detected reflection synchronization signal block based on a measurement metric of the detected synchronization signal block and the detected reflection synchronization signal block. Further, the method may include performing an access procedure with a network element using the selected synchronization signal block or the selected reflection synchronization signal block.

Other example embodiments may be directed to a computer program product that performs a method. The method may include scanning for a synchronization signal block and a reflection surface synchronization signal block during a cell search at a first frequency. The method may also include, when the synchronization signal block is detected, continuing to scan the first frequency for the reflection surface synchronization signal block. The method may further include when the reflection surface synchronization signal block is detected and not the synchronization signal block, scanning a second frequency for the synchronization signal block. In addition, the method may include selecting the detected synchronization signal block or the detected reflection synchronization signal block based on a measurement metric of the detected synchronization signal block and the detected reflection synchronization signal block. Further, the method may include performing an access procedure with a network element using the selected synchronization signal block or the selected reflection synchronization signal block.

Other example embodiments may be directed to an apparatus that may include circuitry configured to scan for a synchronization signal block and a reflection surface synchronization signal block during a cell search at a first frequency. The apparatus may also include circuitry configured to, when the synchronization signal block is detected, continue to scan the first frequency for the reflection surface synchronization signal block. The apparatus may further include circuitry configured to, when the reflection surface synchronization signal block is detected and not the synchronization signal block, scan a second frequency for the synchronization signal block. In addition, the apparatus may include circuitry configured to select the detected synchronization signal block or the detected reflection synchronization signal block based on a measurement metric of the detected synchronization signal block and the detected reflection synchronization signal block. Further, the apparatus may include circuitry configured to perform an access procedure with a network element using the selected synchronization signal block or the selected reflection synchronization signal block.

Certain example embodiments may be directed to a method. The method may include determining a reflection surface synchronization signal block configuration for a transmission. The method may also include transmitting one or more reflection surface synchronization signal blocks on a beam. The method may further include configuring a reflection surface of a reflecting surface device to reflect each of the one or more reflection synchronization signal blocks in a different departure angle. In addition, the method may include determine whether the beam for a user equipment corresponds to a synchronization signal block or one of the one or more reflection surface synchronization signal blocks based on a random access channel occasion. Further, the method may include configure the reflection surface to reflect a signal transmitted on the beam to the user equipment.

Other example embodiments may be directed to an apparatus. The apparatus may include at least one processor and at least one memory including computer program code. The at least one memory and computer program code may be configured to, with the at least one processor, cause the apparatus at least to determine a reflection surface synchronization signal block configuration for a transmission. The apparatus may also be caused to transmit one or more reflection surface synchronization signal blocks on a beam. The apparatus may further be caused to configure a reflection surface of a reflecting surface device to reflect each of the one or more reflection synchronization signal blocks in a different departure angle. In addition, the apparatus may be caused to determine whether the beam for a user equipment corresponds to a synchronization signal block or one of the one or more reflection surface synchronization signal blocks based on a random access channel occasion. Further, the apparatus may be caused to configure the reflection surface to reflect a signal transmitted on the beam to the user equipment.

Other example embodiments may be directed to an apparatus. The apparatus may include means for determining a reflection surface synchronization signal block configuration for a transmission. The apparatus may also include means for transmitting one or more reflection surface synchronization signal blocks on a beam. The apparatus may further include means for configuring a reflection surface of a reflecting surface device to reflect each of the one or more reflection synchronization signal blocks in a different departure angle. In addition, the apparatus may include means for determining whether the beam for a user equipment corresponds to a synchronization signal block or one of the one or more reflection surface synchronization signal blocks based on a random access channel occasion. Further, the apparatus may include means for configuring the reflection surface to reflect a signal transmitted on the beam to the user equipment.

In accordance with other example embodiments, a non-transitory computer readable medium may be encoded with instructions that may, when executed in hardware, perform a method. The method may include determining a reflection surface synchronization signal block configuration for a transmission. The method may also include transmitting one or more reflection surface synchronization signal blocks on a beam. The method may further include configuring a reflection surface of a reflecting surface device to reflect each of the one or more reflection synchronization signal blocks in a different departure angle. In addition, the method may include determine whether the beam for a user equipment corresponds to a synchronization signal block or one of the one or more reflection surface synchronization signal blocks based on a random access channel occasion. Further, the method may include configure the reflection surface to reflect a signal transmitted on the beam to the user equipment.

Other example embodiments may be directed to a computer program product that performs a method. The method may include determining a reflection surface synchronization signal block configuration for a transmission. The method may also include transmitting one or more reflection surface synchronization signal blocks on a beam. The method may further include configuring a reflection surface of a reflecting surface device to reflect each of the one or more reflection synchronization signal blocks in a different departure angle. In addition, the method may include determine whether the beam for a user equipment corresponds to a synchronization signal block or one of the one or more reflection surface synchronization signal blocks based on a random access channel occasion. Further, the method may include configure the reflection surface to reflect a signal transmitted on the beam to the user equipment.

Other example embodiments may be directed to an apparatus that may include circuitry configured to determine a reflection surface synchronization signal block configuration for a transmission. The apparatus may also include circuitry configured to transmit one or more reflection surface synchronization signal blocks on a beam. The apparatus may further include circuitry configured to configure a reflection surface of a reflecting surface device to reflect each of the one or more reflection synchronization signal blocks in a different departure angle. In addition, the apparatus may include circuitry configured to determine whether the beam for a user equipment corresponds to a synchronization signal block or one of the one or more reflection surface synchronization signal blocks based on a random access channel occasion. Further, the apparatus may include circuitry configured to configure the reflection surface to reflect a signal transmitted on the beam to the user equipment.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for configuring an intelligent reflecting surface using dedicated reference signals.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

An intelligent reflecting surface (IRS) is a planar surface including many passive reflecting elements, each of which may be able to independently induce a controllable amplitude and/or phase change to the incident signal. Each reflecting element may passively reflect impinging signals without requiring any radio frequency (RF) chain. By deploying IRSs in a wireless network and smartly coordinating their reflections, the signal propagation/wireless channels between transmitters and receivers can be flexibly reconfigured to achieve desired realizations and/or distributions. For example, the reflecting elements can be tuned to create a desirable multipath effect or cause the reflected RF signals to coherently add in a particular direction to improve the received signal power at a receiver. Further, an IRS may be considered analogous to a full-duplex relay but without antenna noise amplification and self-interference.

Figure 1:
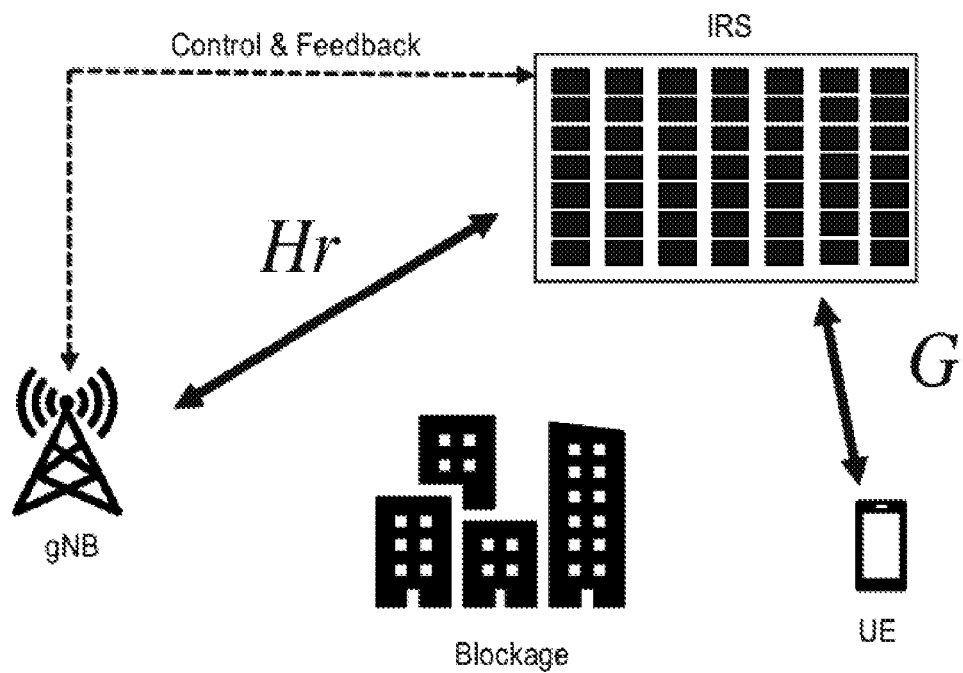
FIG. 1 illustrates an example of using an intelligent reflecting surface (IRS).

There may be certain potential use cases for IRSs, which may include, for example, overcoming signal blockage and extension of propagation from outdoors-to-indoors. In the former case, FIG. 1 illustrates an example of using an IRS to overcome signal blockage. In particular, the signal from the transmitting source may be blocked by obstacles. This may be a problem at millimeter-wave frequencies and above. In this case, the IRS may be placed strategically in the environment to provide coverage extension or blockage mitigation. In the latter case, outdoor-to-indoor penetration loss may cause coverage problems for indoor UEs. Taking advantage of the fact that a signal passing through a window may experience a minor loss, an IRS may be deployed inside and near the window to capture signal energy and reflect it towards the UE.

Figure 2:
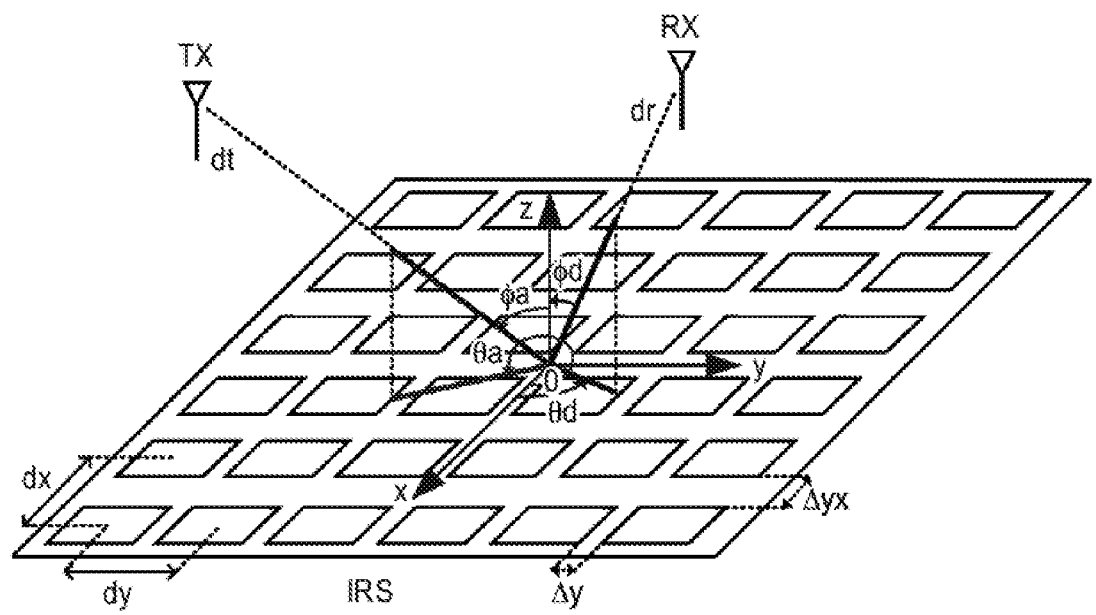
FIG. 2 illustrates an example IRS geometry.

FIG. 2 illustrates an example IRS geometry. In particular, FIG. 2 illustrates a rectangular planar IRS with N×M reflecting elements where the azimuth angle is denoted as θ and the vertical angle is denoted as φ. For each reflecting element, the impedance may be designed to realize the reflection coefficient $\beta e^{j\gamma}$, where $\beta \in [0,1]$ is the controllable amplitude gain, and $\gamma \in [0,2\pi]$ is the controllable phase shift. The separation between the center of adjacent reflecting elements (REs) is denoted by $d_x$ and $d_y$ along two orthogonal axes on the IRS plane, $d_t$ is the distance from the mid-point on the IRS to the transmitter (TX), and $d_r$ is the distance from the mid-point on the IRS to the receiver (RX).

The received power considering a SISO free space channel path loss function of IRS can be modeled as equation (1) as follows:

$$P_r = P_t G \left| \sum_{n=1-\frac{N}{2}}^{N/2} \sum_{m=1-\frac{M}{2}}^{M/2} G_{n,m} \beta_{n,m} e^{\frac{-j2\pi(r_{n,m}^t + r_{n,m}^r)}{\lambda} + j\gamma_{n,m}} \right|^2$$

In equation (1), $P_t$ is the transmit power, and G is the channel gain, which is proportional to antenna gains, RE area, and wavelength. Further, $G_{n,m}$, is related to the power radiation patterns on the receive signal power, and $\beta_{n,m}$, and $\gamma_{n,m}$ are the reconfigurable amplitude and phase in RE (n, m), respectively. In addition, $r_{n,m}^t$ is the distance from RE (n, m) to the transmitter and $r_{n,m}^r$ is the distance from RE (n, m) to the receiver.

More specifically, $r_{n,m}^t$ is given by equation (2) as follows:

$$r_{n,m}^t = \sqrt{\left(d_t \sin(\phi_a)\cos(\theta_a) - \left(m - \frac{1}{2}\right)d_x\right)^2 + \left(d_t \sin(\phi_a)\sin(\theta_a) - \left(n - \frac{1}{2}\right)d_y\right)^2 + (d_t \cos(\phi_a))^2} \approx$$

$$d_t - \sin(\phi_a)\cos(\theta_a)\left(m - \frac{1}{2}\right)d_x - \sin(\phi_a)\sin(\theta_a)\left(n - \frac{1}{2}\right)d_y,$$

and $r_{n,m}^r$ is given by equation (3) as follows:

$$r_{n,m}^r = \sqrt{\left(d_r\sin(\phi_a)\cos(\theta_a) - \left(m-\frac{1}{2}\right)d_x\right)^2 + \left(d_r\sin(\phi_a)\sin(\theta_a) - \left(n-\frac{1}{2}\right)d_y\right)^2 + (d_r\cos(\phi_a))^2} \approx$$

$$d_r - \sin(\phi_a)\cos(\theta_a)\left(m-\frac{1}{2}\right)d_x - \sin(\phi_a)\sin(\theta_a)\left(n-\frac{1}{2}\right)d_y.$$

To maximize the received power $P_r$, $\gamma_{n,m}$ can be designed as equation (4) as follows:

$$\gamma_{n,m} = \partial_{x,n} + \partial_{y,m}$$

where $$\partial_{x,n} = \mod\left(-\frac{2\pi d_x n(\sin(\phi_a)\cos(\theta_a) - \sin(\phi_d)\cos(\theta_d))}{\lambda}\right)_{2\pi},$$

$$\partial_{y,m} = \mod\left(-\frac{2\pi d_y m(\sin(\phi_a)\sin(\theta_a) - \sin(\phi_d)\sin(\theta_d))}{\lambda}\right)_{2\pi}.$$

The above equations may imply that if $\phi_a$, $\theta_a$, $\phi_d$, $\theta_d$ are known to the gNB, it can calculate the values $\partial_{x,n}$, $\partial_{y,m}$ to maximize the power of the signals transmitted by the gNB that are received by the UE when the signals arrive at the IRS from the gNB at angles $\phi_a$, $\theta_a$, and depart from (i.e., are reflected by) the IRS towards the UE at angles $\phi_d$, $\theta_d$. The gNB may then control the IRS to configure the phase shifts $\partial_{x,n}$, $\partial_{y,m}$. In certain cases, the control may be performed through a wired or wireless interface between the gNB and the IRS.

Since $\phi_a$, $\theta_a$, $\phi_d$, $\theta_d$ are independent, it may be possible to obtain: $\sin(\phi_a)\cos(\theta_a) - \sin(\phi_d)\cos(\theta_d) \in [-2, 2]$, $\sin(\phi_a)\sin(\theta_a) - \sin(\phi_d)\sin(\theta_d) \in [-2, 2]$. One way to determine the arrival and/or departure angles may be through configuring different angles from a codebook. For example, the codebook can be based on uniform construction. That is, defining a step $\Delta$, the uniform codebook for the phase control values $\partial_{x,n}$, $\partial_{y,m}$ of each reflecting element may be constructed as B=[−2, −2+$\Delta$, . . . , 2−$\Delta$, 2] where $\Delta$ depends on the resolution of the phase control in reflecting elements. For a given pair of arrival angles {$\phi_a$, $\theta_a$}, different pairs of departure angles {$\phi_d$, $\theta_d$} may be determined to obtain each of the values in the codebook B and vice versa.

Figure 3:
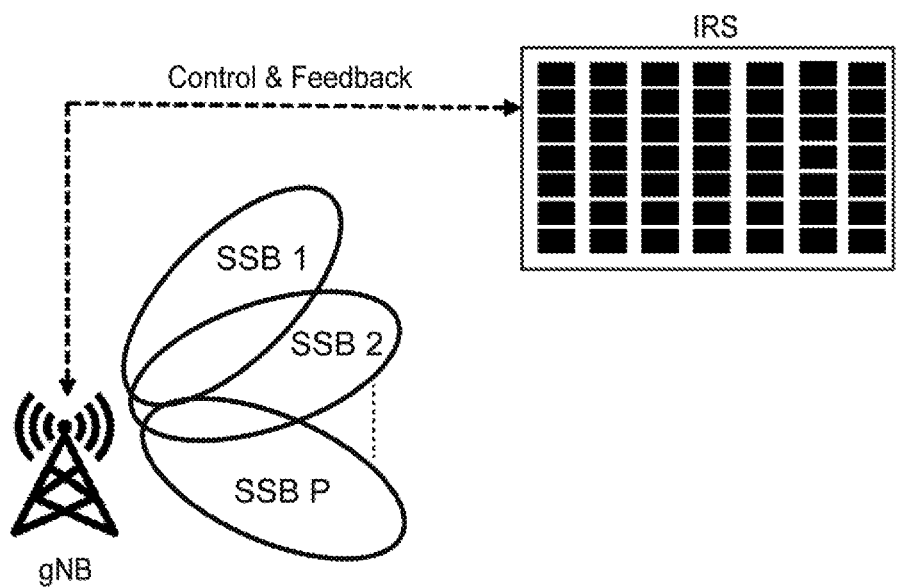
FIG. 3 illustrates an example of determining the best beam transmitted by the gNB and received at the IRS.

Certain cases may consider an NR system with a gNB and an IRS placed strategically in the environment to provide coverage extension or blockage mitigation. To build up the connection between a gNB and a UE with the IRS, the gNB may acquire certain information from $H_r$ and G. For instance, FIG. 3 illustrates an example of determining the best beam transmitted by the gNB and received at the IRS. Alternatively, obtaining only the spatial domain information (beam directions) of the channels may reduce the channel estimation overhead. With this approach, for the gNB to correctly configure the IRS to reflect the signals from the gNB towards a UE, the gNB may determine the arrival angles $\langle\phi_a, \theta_a\rangle$, and the departure angles $\langle\phi_d, \theta_d\rangle$. Thus, from the gNB's perspective, certain problems may be solved including, for example, determining the best beam transmitted by the gNB and arriving at the IRS, determining the arrival angles (azimuth and vertical) of signals transmitted by the gNB on the best beam at the IRS, and determining the best departure angles of the reflected signals from the IRS towards the UE.

Figure 4:
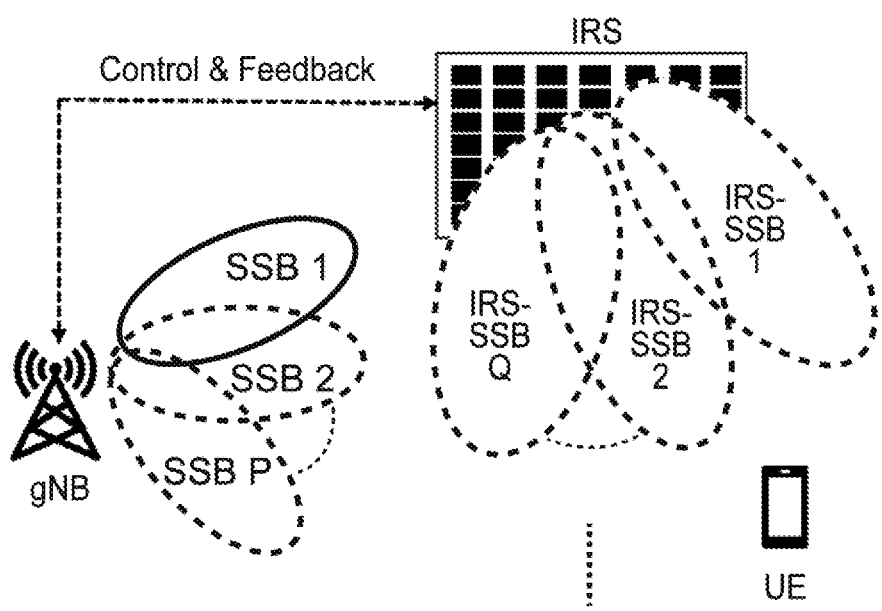
FIG. 4 illustrates an example of determining the best departure angle from the IRS on a reflected beam, according to certain example embodiments.

FIG. 4 illustrates an example of determining the best departure angle from the IRS on a reflected beam, according to certain example embodiments. Certain example embodiments may provide a solution to determining the best departure angles of the reflected signals from the IRS towards the UE based on, for example, RSRP measurements for different departure angles configured for the IRS. Therefore, in certain example embodiments, it may be assumed that the gNB has already determined the best beam among P beams transmitted by the gNB and arriving at the IRS. Furthermore, the arrival angles $\langle\phi_a, \theta_a\rangle$ of this beam at the IRS may also be assumed to be known. The gNB may determine the best departure angles $\langle\phi_d, \theta_d\rangle$ corresponding to one of Q candidate reflected "beams" as shown in FIG. 4. In certain example embodiments, the best departure angle may be an angle that maximizes the received power described in equation (1), which is what the subsequent equations described herein, and the associated explanations address. As noted above in some example embodiments, RSRP may be used to determine the best angles.

Certain methods may be based on utilizing uplink reference signals for gNB to sense the product of $H_r$ and G. This kind of method may introduce a large overhead for channel training. The NR beam management procedure may include transmission of reference signals (SSBs or CSI-RSs) by the gNB on different beams and reporting back by the UE of the best beam(s) based on measurement of the reference signals. Hereinafter, "best SSB beam" refers to the SSB beam for which a measurement metric such as RSRP or SINR is highest. During initial access, the UE may determine the best SSB beam that it receives based on measurements on all candidate SSBs and perform random access where the random access channel (RACH) occasion provides an implicit indication to the gNB of the best beam due to the association between SSBs and the RACH occasion, as signaled in the RACH configuration. This procedure is defined for direct links between the gNB and the UE. An embodiment can build on this procedure for the case where additional reference signals are transmitted by the gNB to enable the UE to identify the best reflected beam.

Certain example embodiments may assume that the gNB has already determined the best SSB beam arriving at the IRS and the corresponding arrival angles $\phi_a = \Phi_{SSB}$, $\theta_a = \Theta_{SSB}$ to be assumed when configuring the phase shifts at the IRS for different departure angles for downlink communication. In addition, certain example embodiments may provide a method for the gNB to determine the best departure angles for reflecting transmissions from the gNB towards a UE with the capability to be supported by an IRS. In certain example embodiments, this may be achieved by configuring different departure angles for successively transmitted reference signals that are reflected by the IRS and monitored by the UE.

According to certain example embodiments, an intelligent reflecting surface-synchronization signal block (IRS-SSB) burst set may be defined for optional transmission when a cell supports IRS. An SSB burst set may include the set of SSBs that are periodically transmitted in a fixed pattern. The maximum number of SSBs in a burst set and the time instances at which they may be transmitted may be dependent on the carrier frequency and may be defined in the specification. Similarly, an IRS-SSB burst set may be defined to include the set of IRS-SSBs that are periodically transmitted in a fixed pattern. In particular, in some example embodiments, the maximum number of IRS-SSBs supported may be pre-defined, and may be different from the maximum number of SSBs supported. In other example embodiments, IRS-SSB periodicity may be different from SSB periodicity. In addition, according to certain example embodiments, the minimum time gap between successive IRS-SSBs within a burst set may be large enough to accommodate the switching time between different departure angle configurations at the IRS for reflecting successive IRS-SSBs.

Figure 5:
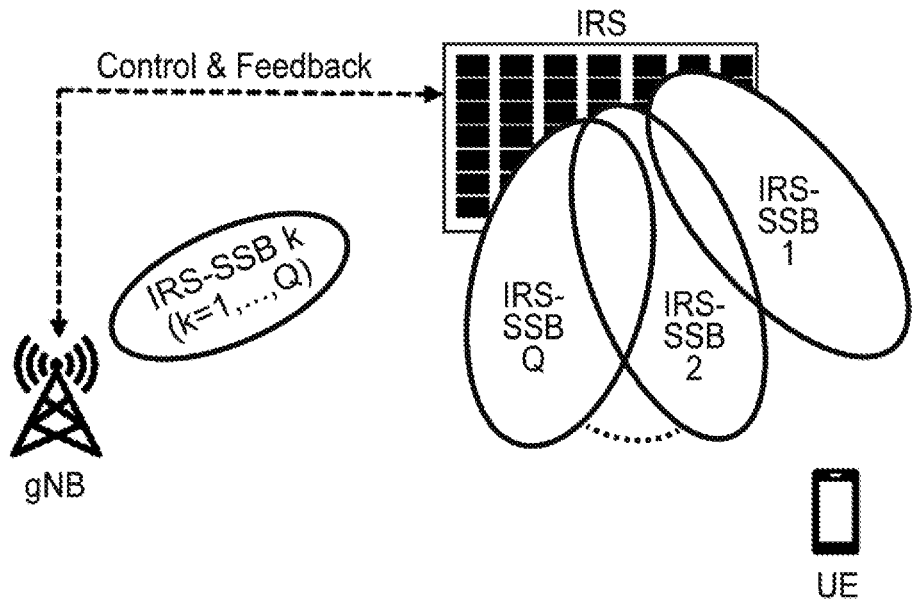
FIG. 5 illustrates an example where the IRS is configured to reflect intelligent reflecting surface-synchronization signal blocks (IRS-SSBs) of a burst set received from the gNB at different departure angles, according to certain example embodiments.

In certain example embodiments, all the IRS-SSBs in a burst set may be transmitted by the gNB on the same beam (best beam) and in different time/frequency locations relative to the SSB burst set. In addition, beam switching at the gNB may not be required for transmission of different IRS-SSBs in a burst set. According to other example embodiments, during the transmission of IRS-SSBs in a burst set, the gNB may configure the IRS to sweep over a pre-determined set of departure angles, as illustrated in FIG. 5. In particular, FIG. 5 illustrates an example where the IRS is configured to reflect the IRS-SSBs of a burst set received from the gNB at different departure angles, according to certain example embodiments.

Figure 6:
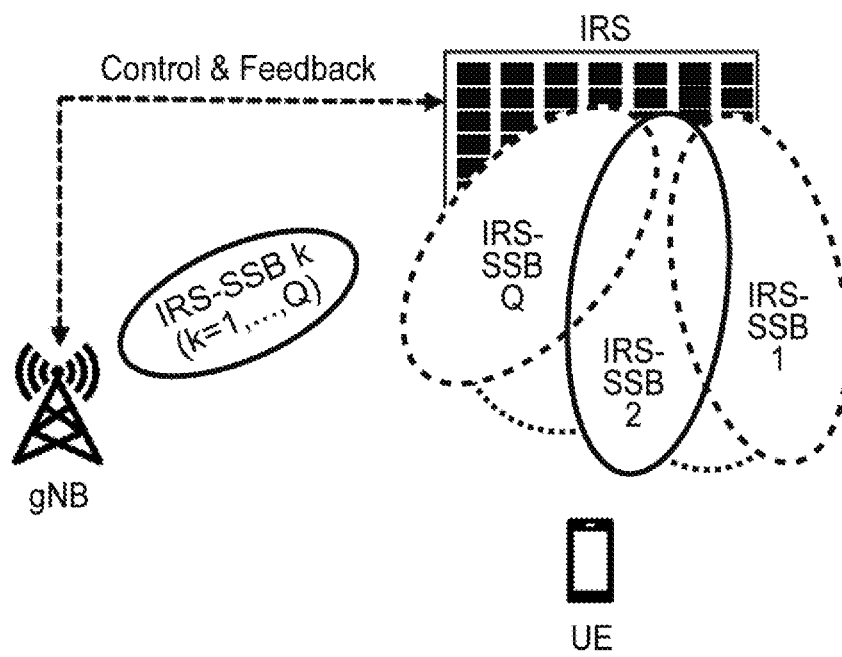
FIG. 6 illustrates an example user equipment determination and operation procedure, according to certain example embodiments.

According to certain example embodiments, the UE may monitor both SSBs and IRS-SSBs and determine the best among all SSBs and IRS-SSBs. For instance, FIG. 6 illustrates an example user equipment determination and operation procedure, according to certain example embodiments. In particular, FIG. 6 illustrates a UE blocked from the gNB, which determines the best IRS-SSB reflection that it receives, and performs random access (RA) on the corresponding RACH occasion, according to certain example embodiments. In certain example embodiments, the determination of the best among a certain number of SSBs and IRS-SSBs may be based on reference signal received power (RSRP), or signal to interference plus noise ratio (SINR), etc. According to other example embodiments, the UE may perform random access using the RACH occasion corresponding to the best SSB or IRS-SSB.

In some example embodiments, for the RACH occasion corresponding to IRS-SSB n, the gNB may configure the phase shifts at the IRS (for facilitating uplink communication) assuming arrival angles $\phi_a=\Phi_n$, $\theta_a=\Theta_n$ and departure angles $\phi_d=\Phi_{SSB}$, $\theta_d=\Theta_{SSB}$ to receive the reflection of the PRACH transmission from the IRS at the gNB. In addition, reception by the gNB of a PRACH signal reflected by the IRS in a RACH occasion corresponding to an IRS-SSB n may provide an implicit indication that the best departure angles at the IRS for downlink transmissions (and best arrival angles for uplink transmissions) are ($\Phi_n$, $\Theta_n$).

According to other example embodiments, the UE may report its capability for supporting communication utilizing the IRS, for example, to receive IRS-SSBs. In certain example embodiments, the UE with this capability may have a higher complexity relative to other UEs without this capability due to having to also receive IRS-SSBs and process measurements of the corresponding RSRP or SINR. In addition, the gNB may use this information to provide IRS-SSB configuration information through unicast/dedicated signaling if the UE performs initial access based on SSB measurement. In other example embodiments, during subsequent downlink transmissions to the UE, the gNB may configure the phase shifts at the IRS corresponding to departure angles $\phi_d=\Phi_n$, $\theta_d=\Theta_n$. Further, during subsequent uplink transmissions from the UE, the gNB may configure the phase shifts at the IRS corresponding to arrival angles $\phi_a=\Phi_n$, $\theta_a=\Theta_n$.

According to certain example embodiments, a UE with the capability for supporting communication utilizing the IRS may have a higher complexity to measure additional reference signals for beam management. The UE may also access the network before reporting the capability. In certain example embodiments, if the UE performs random access based on measuring an IRS-SSB beam as the best beam, it may provide the network an implicit indication of the UE capability to be supported by the IRS. Otherwise, if the UE performs random access based on measuring an SSB beam as the best beam, the UE may report this capability using normal procedure (i.e., via a UE capability information message in response to a UE capability enquiry message from the network) to enable the network to configure the UE for measurement of IRS-SSBs or otherwise provide IRS-SSB configuration information to the UE via unicast/dedicated signaling.

In certain example embodiments, a gNB supporting IRS-based communication may enable support for the IRS by turning on transmissions of the IRS-SSB; likewise, it may disable support for the IRS by turning off IRS-SSB transmissions. According to certain example embodiments, when the gNB disables support for the IRS, the IRS is turned off and may behave like any other reflecting surface, without the ability to focus reflections of an incident signal in any particular direction. The gNB may also dynamically turn off the IRS, for example, when it is transmitting SSBs or other signals that are not required to be reflected by the IRS.

According to certain example embodiments, IRS-SSBs may have the same physical signal structure as SSBs but have different scrambling initialization for physical broadcast channel (PBCH) and demodulation reference signal (DMRS). This distinguishes the IRS-SSBs from the SSBs, and uniquely identifies each IRS-SSB in a burst set. However, in some example embodiments, the Master Information Block (MIB) content in the PBCH of IRS-SSBs may be the same as that in SSBs except for indexing information. Therefore, for a UE that is capable of IRS support, the IRS-SSB burst set may appear as an extension of the SSB burst set, although the IRS-SSB burst set may be transmitted in distinctly different time-frequency resources.

In certain example embodiments, the maximum number of IRS-SSBs that may be transmitted in a burst set may be pre-defined (e.g., for each frequency range supported). This number may be different from the maximum number of SSBs defined for the same frequency range. This number may also determine the maximum number of different departure angles from the IRS that can be configured. In some example embodiments, the maximum number of IRS-SSBs may be defined based on one or more factors which may include, for example, UE complexity considerations, the number of distinct departure angles that are expected to be supported in practical scenarios, and the resolution of the phase control in reflecting elements.

According to certain example embodiments, the IRS-SSB burst set may be defined to allow a larger time gap between successive IRS-SSBs compared with SSBs in a burst set. This may be done to accommodate the switching time between different departure angles configured for the IRS for reflecting successively transmitted IRS-SSBs. In certain example embodiments, the actual number Q of IRS-SSBs transmitted by the gNB may be smaller than the maximum number defined. The gNB may determine this number Q separately for each deployed IRS based on one or more factors, which may include, for example, the angular range for reflections from the IRS that needs to be supported in the particular deployment, and the resolution of the phase control in reflecting elements. For instance, in some example embodiments, the desired angular range for reflections around a corner of a building or an indoor corridor may be different from the angular range for reflection of signals from outdoors to indoors.

Figure 7:
FIG. 7 illustrates an example IRS-SSB burst set transmitted with a time offset relative to an SSB burst set, according to certain example embodiments.

FIG. 7 illustrates an example IRS-SSB burst set transmitted with a time offset relative to an SSB burst set, according to certain example embodiments. As illustrated in FIG. 7, the IRS-SSBs in a burst set may be transmitted by the gNB with a time offset relative to the SSB burst set at the same frequency. While the gNB may generally transmit each SSB in a burst set on a different beam, it may transmit all IRS-SSBs in a burst set on the same beam, which may be the best beam received by the IRS. Thus, in some example embodiments, the IRS-SSBs may not be frequency multiplexed with SSBs (with no time offset).

Figure 8:
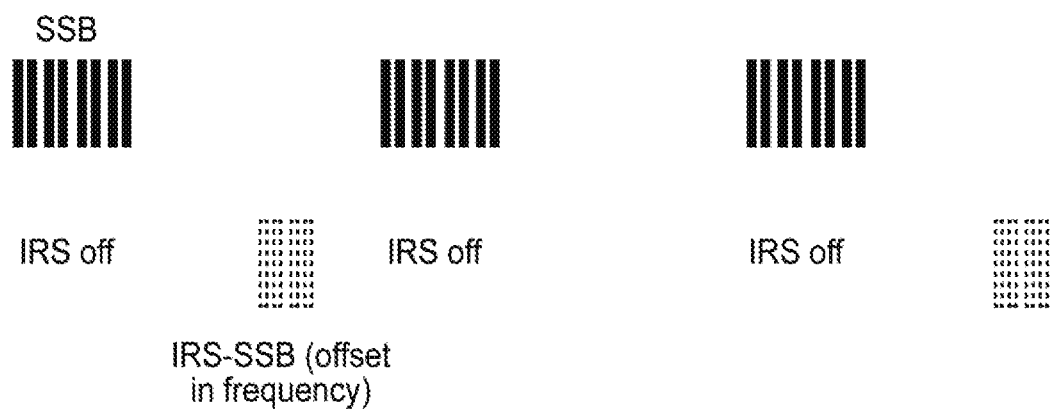
FIG. 8 illustrates an example IRS-SSB burst set transmitted with a time offset and frequency offset relative to the SSB burst set, according to certain example embodiments.

FIG. 8 illustrates an example IRS-SSB burst set transmitted with a time offset and frequency offset relative to the SSB burst set, according to certain example embodiments. In particular, the IRS-SSB burst set may be transmitted on the SSB raster, which may allow the UE to find the IRS-SSBs during cell search.

According to certain example embodiments, the periodicity of the IRS-SSB burst set transmission may be different from that of the SSB burst set transmission. For example, the gNB may transmit the IRS-SSB burst set with a lower periodicity (as illustrated in FIG. 7 and FIG. 8) if initial access latency for UEs supported by IRS-SSBs can be relaxed, or to reduce the overhead due to IRS-SSB transmission. Thus, in certain example embodiments, the IRS-SSB burst set design and configuration may be different compared with the SSB burst set according to the constraints of the IRS and requirements in a particular deployment.

In certain example embodiments, to determine the departure angles $\langle \phi_d, \theta_d \rangle$ from the IRS for reflections to the UE, the gNB may perform a procedure similar to beam sweeping. For example, the phase shifts at the IRS may be configured for different departure angles from a pre-determined set. In addition, for each IRS-SSB in a burst set, the phase shifts at the IRS may be configured to reflect the signal received from the gNB (i.e., the IRS-SSB) at a different departure angle. Thus, there may be a one-to-one correspondence between the IRS-SSB transmitted by the gNB and the departure angle at which this signal is reflected (or equivalently, the phase shift setting at the IRS).

According to certain example embodiments, when a UE capable of IRS support enters a network, it may monitor both SSBs and IRS-SSBs during cell search. The UE may determine the best SSB or IRS-SSB based on measured RSRP, or SINR, or other metrics. For example, the UE may determine that the best beam it is receiving corresponds to IRS-SSB n (which the gNB configured the IRS to reflect at departure angles $\phi_d = \Phi_n$, $\theta_d = \Theta_n$).

In certain example embodiments, the RACH configuration may define the association between RACH occasion and IRS-SSBs such that there is a unique RACH occasion corresponding to each IRS-SSB, which may be similar to that for SSBs. Thus, when a UE performs random access using the RACH occasion corresponding to an IRS-SSB, this may provide an implicit and unambiguous indication to the gNB that the UE has determined an IRS-SSB reflection as the best beam and the corresponding IRS-SSB index.

In other example embodiments, during RACH occasions, the gNB may configure the phase shifts at the IRS for reflecting the uplink transmissions based on the arrival and departure angles assumed for the corresponding IRS-SSB transmission. For instance, according to some example embodiments, assuming reciprocity of IRS operation, the arrival and departure angles may be exchanged for configuring the phase shifts. Thus, for the RACH occasion corresponding to IRS-SSB n, the gNB may configure the phase shifts at the IRS assuming arrival angles $\phi_a = \Phi_n$, $\theta_a = \Theta_n$ and departure angles $\phi_d = \Phi_{SSB}$, $\theta_d = \Theta_{SSB}$ to enable proper reception by the gNB of the reflection of the PRACH transmission by the IRS. Furthermore, reception by the gNB of a physical random access channel (PRACH) signal reflected by the IRS in a RACH occasion corresponding to an IRS-SSB n may provide an implicit indication that the best departure angles at the IRS for downlink transmissions (and best arrival angles for uplink transmissions) are $\langle \Phi_n, \Theta_n \rangle$. Following this determination, the gNB can configure the phase shifts at the IRS corresponding to departure angles $\langle \Phi_n, \Theta_n \rangle$ for downlink transmissions to the UE, and phase shifts corresponding to arrival angles $\langle \Phi_n, \Theta_n \rangle$ for uplink transmissions from the UE.

According to certain example embodiments, in NR, the SIBs may either be broadcast or alternatively they may be unicast to UEs. In the former case, the SIBs may be transmitted on all beams whereas in the latter case, they may selectively be transmitted to UEs as needed. Whereas the gNB may determine to broadcast the SIBs on all beams, in certain example embodiments, the gNB may determine to unicast the SIBs to UEs on selected beams reflected by the IRS to reduce system overhead.

Figure 9:
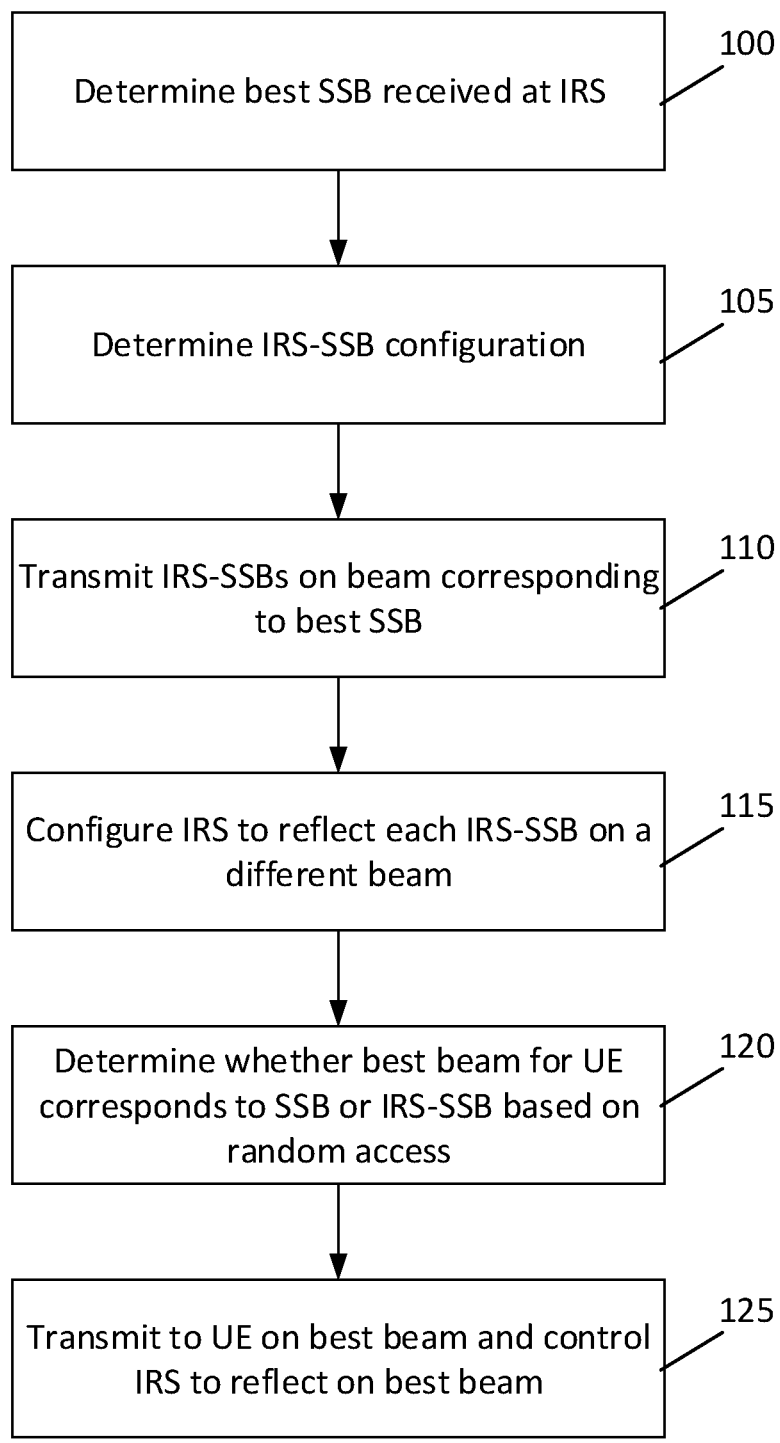
FIG. 9 illustrates an example gNB operation, according to certain example embodiments.

FIG. 9 illustrates an example gNB operation, according to certain example embodiments. In particular, the example gNB operation may be for determining the departure angles at the IRS for downlink (DL) transmission to a UE using IRS-SSBs. As illustrated in the example of FIG. 9, at 100, the gNB may determine the best SSB received at the IRS. At 105, the gNB may determine a particular IRS-SSB configuration. Further, at 110, the gNB may transmit IRS-SSBs on a beam corresponding to the best SSB (i.e., best beam). In addition, at 115, the gNB may configure the IRS to reflect each IRS-SSB on a different beam. For instance, the IRS-SSB may be transmitted by the gNB on a same beam (and hence the arrival angles at the IRS may be the same for all IRS-SSBs). Additionally, each IRS-SSB may then be reflected on a different beam (e.g., different departure angle). At 120, the gNB may determine whether the best beam for the UE corresponds to the SSB or IRS-SSB based on a random access channel occasion. At 125, the gNB may transmit to the UE on the best beam and control the IRs to reflect the transmission on the best beam.

Figure 10:
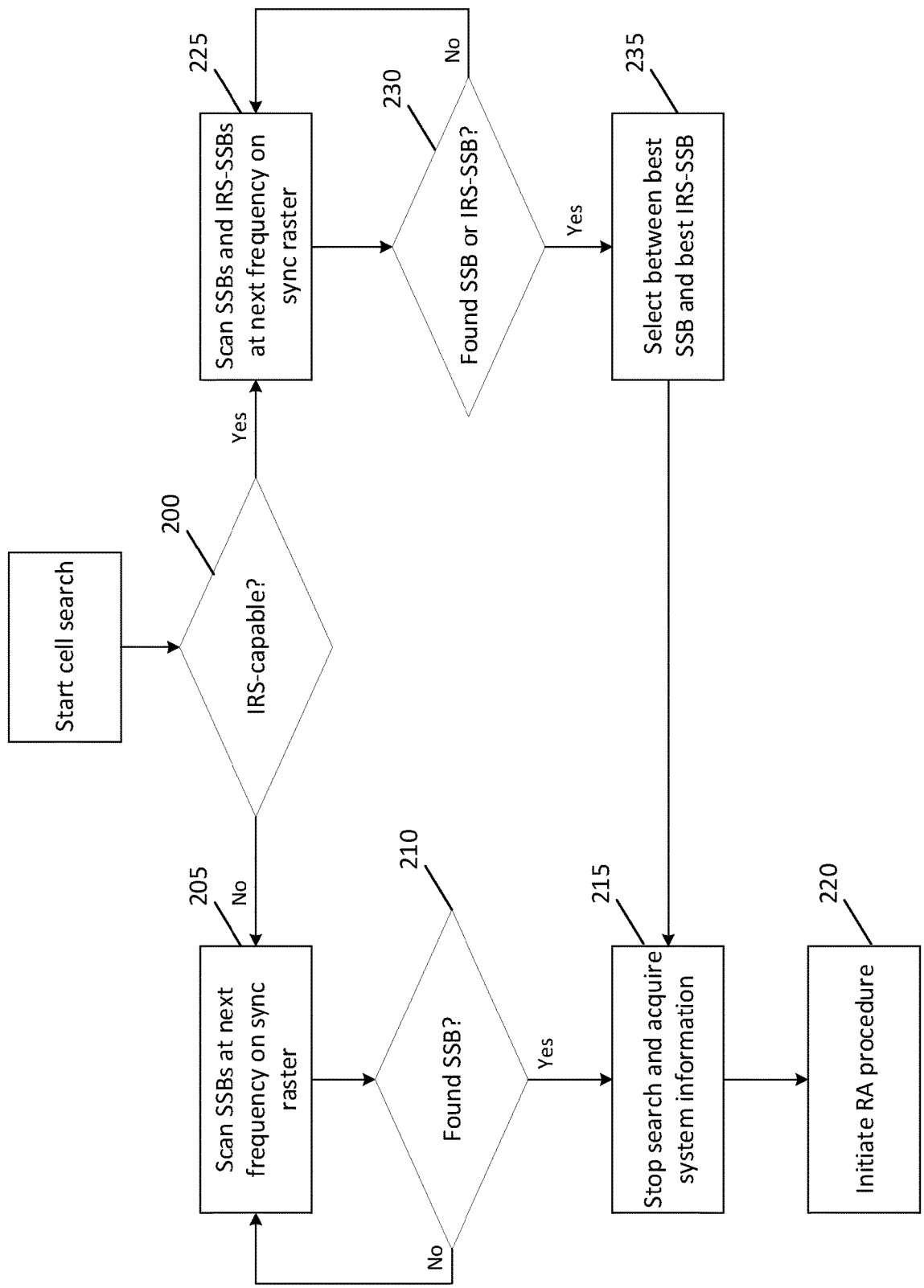
FIG. 10 illustrates an example UE operation, according to certain example embodiments.

FIG. 10 illustrates an example UE operation, according to certain example embodiments. In particular, the example of FIG. 10 may relate to a UE operation if SSBs and IRS-SSBs are on the same frequency. In certain example embodiments, the UE behavior for detecting IRS-SSBs may depend on whether the IRS-SSBs are transmitted on the same frequency as the SSBs, or whether they are transmitted on different frequencies on the SSB raster. In the example of FIG. 10, when a UE that is capable of IRS support performs a cell search at a frequency on the raster, it may scan SSBs and IRS-SSBs. It may then select the best among all SSBs and IRS-SSBs based on measurement of, for example, RSRP. The UE may then perform random access at the corresponding RACH occasion, as previously described. If the UE does not detect SSBs or IRS-SSBs, it may move to the next search frequency on the raster.

As illustrated in the example of FIG. 10, the UE may, at 200, determine whether or not it is capable of IRS support. If no, at 205, the UE may scan SSBs at the next frequency on a synchronization raster. At 210, the UE may determine if an SSB has been found. If no, the operation may return to 205, and the UE may perform another scan of the SSBs at a next frequency on the synchronization raster. If yes, however, at 215, the UE may stop searching, and acquire system information from the system information blocks. At 220, the UE may initiate an RA procedure based on the acquired system information. According to certain example embodiments, the RA procedure may be performed between the UE and the gNB based on the selected best SSB or IRS-SSB. When the RA procedure is performed based on the selected best IRS-SSB, the signals transmitted during the procedure are received after reflection at the IRS.

As further illustrated in FIG. 10, if at 200 the UE determines that it is capable of IRS support, the UE may, at 225, perform a cell search at a frequency on the raster and scan SSBs and IRS-SSBs. At 230, the UE may determine whether it has found an SSB or IRS-SSB whose signal strength (e.g., RSRP) exceeds a pre-determined threshold. If no, the procedure may return to 225. If yes, the UE may, at 235, select the best among all the SSBs and IRS-SSBs based on measurement of, for example, RSRP, or other metrics.

Figure 11:
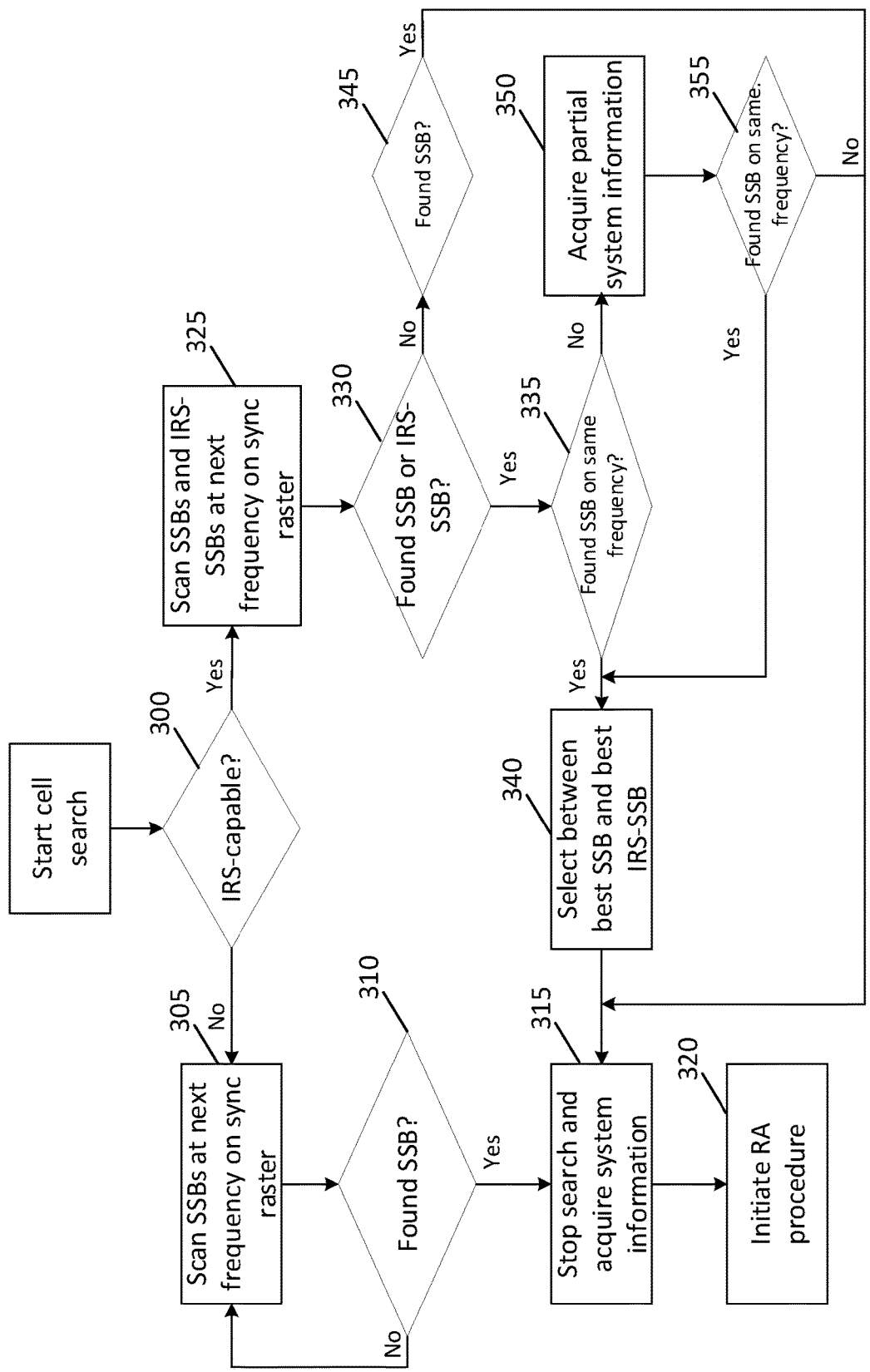
FIG. 11 illustrates another example UE operation, according to certain example embodiments.

FIG. 11 illustrates another example UE operation, according to certain example embodiments. In particular, the example of FIG. 11 may relate to a UE operation if SSBs and IRS-SSBs may be on different frequencies on the raster. For instance, according to certain example embodiments, the UE may detect either IRS-SSBs or SSBs or both at the same frequency. The UE may then acquire at least partial system information from which it can obtain the details of the SSB and IRS-SSB configuration. If the UE detected only SSBs, it may then continue to scan the other frequency at which the IRS-SSBs are transmitted based on the obtained IRS-SSB configuration. On the other hand, if the UE detected only IRS-SSBs, it may be either because the SSBs are blocked in propagation or the SSBs are transmitted at another frequency. The UE may scan the second frequency (determined from system information) for SSBs. If SSBs are detected (which may imply that there is no blockage), the UE may select the best among all SSBs and IRS-SSBs and perform random access at the corresponding RACH occasion.

As illustrated in the example of FIG. 11, at 300, the UE may determine whether or not it is capable of IRS support. If no, at 305, the UE may scan SSBs at the next frequency on a synchronized raster. At 310, the UE may determine if the SSB has been found. If no, the operation may return to 305, and the UE may perform another scan of the SSBs at a next frequency on the synchronized raster. If yes, however, at 315, the UE may stop searching, and acquire system information related to details of the SSB. At 320, the UE may initiate an RA procedure based on the acquired system information.

As further illustrated in FIG. 11, if at 300 the UE determines that it is capable of IRS support, the UE may, at 325, perform a cell search at a frequency on the raster and scan SSBs and IRS-SSBs. At 330, the UE may determine whether it has found an IRS-SSB. If no, at 345, the UE may determine whether it has found an SSB. If, at 345, the UE has not found an SSB, the operation may return to 325. However, if at 345, the UE has found an SSB, the operation may proceed to 315, as described above. If, at 330, an IRS-SSB has been found, the UE may, at 335, determine whether an SSB has been found on the same frequency as the IRS-SSB. If no, at 350, the UE may acquire partial system information from which it may obtain the details of the SSB and IRS-SSB configuration. At 355, the UE may determine, from the partial system information, if it has found an SSB on the same frequency. If SSBs are detected (which may imply that there is no blockage), the UE may select the best among the SSBs and IRS-SSBs, and perform random access at the corresponding RACH occasion. However, if the SSBs are not detected, the operation may proceed to 315 and 320 described above. If, at 335, the SSB has been found on the same frequency, the UE may, at 340, select the best the best among the SSBs and IRS-SSBs, and then proceed to 315 and 320, as described above.

According to certain example embodiments, the UE may be configured to perform and report measurements of SSBs and IRS-SSBs for beam management or other purposes. This may provide the gNB information on whether the UE is blocked from the gNB or is able to receive direct transmissions. In the latter case, the gNB may optimize transmission parameters to enable the UE to receive joint transmissions on the direct link and the IRS-reflected link.

Figure 12:
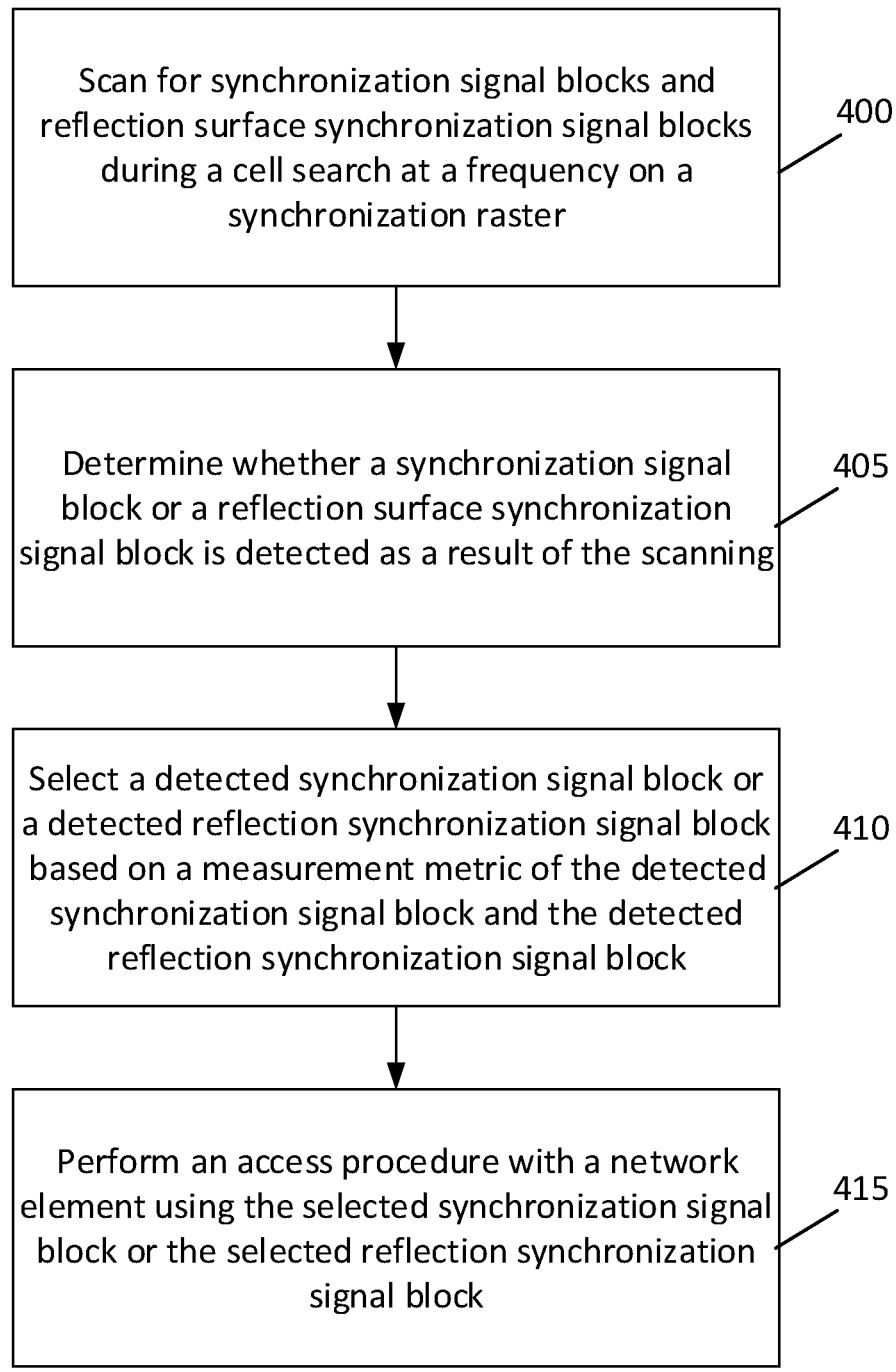
FIG. 12 illustrates an example flow diagram of a method, according to certain example embodiments.
Figure 15A:
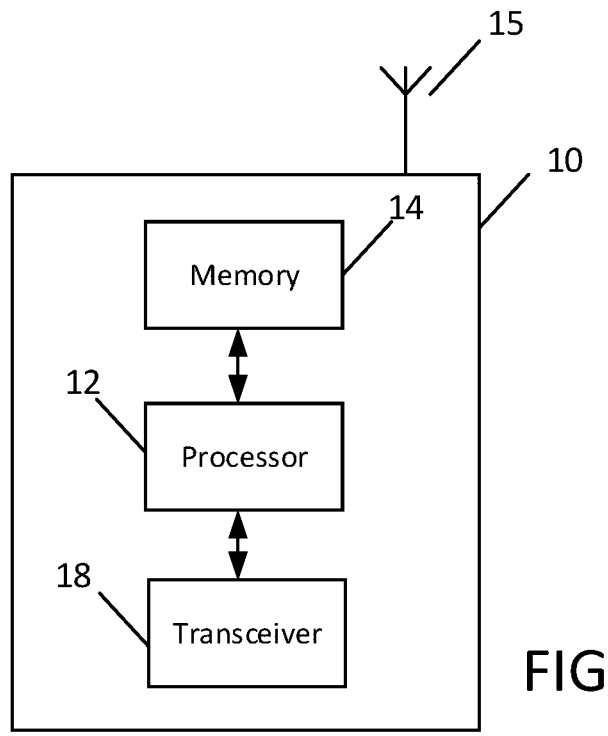
FIG. 15(a) illustrates an apparatus, according to certain example embodiments.

FIG. 12 illustrates an example flow diagram of a method, according to certain example embodiments. In an example embodiment, the method of FIG. 12 may be performed by a network entity, network node, or a group of multiple network elements in a 3GPP system, such as LTE or 5G-NR. For instance, in an example embodiment, the method of FIG. 12 may be performed by a UE, for instance, similar to apparatus 10 illustrated in FIG. 15(a).

According to certain example embodiments, the method of FIG. 12 may include, at 400, scanning for synchronization signal blocks and reflection surface synchronization signal blocks during a cell search at a frequency on a synchronization raster. At 405, the method may include determining whether a synchronization signal block or a reflection surface synchronization signal block is detected as a result of the scanning. At 410, the method may include selecting a detected synchronization signal block or a detected reflection synchronization signal block based on a measurement metric of the detected synchronization signal block and the detected reflection synchronization signal block. At 415, the method may include performing an access procedure with a network element using the selected synchronization signal block or the selected reflection synchronization signal block.

According to certain example embodiments, the measurement metric of the detected synchronization signal block and the detected reflection synchronization signal block may include a reference signal received power or a signal to interference plus noise ratio. According to other example embodiments, the access procedure may be performed using a random access channel occasion corresponding to the selected synchronization signal block or the reflection synchronization signal block. According to further example embodiments, the method may also include reporting a capability of the apparatus to the network element utilizing a reflection surface.

Figure 13:
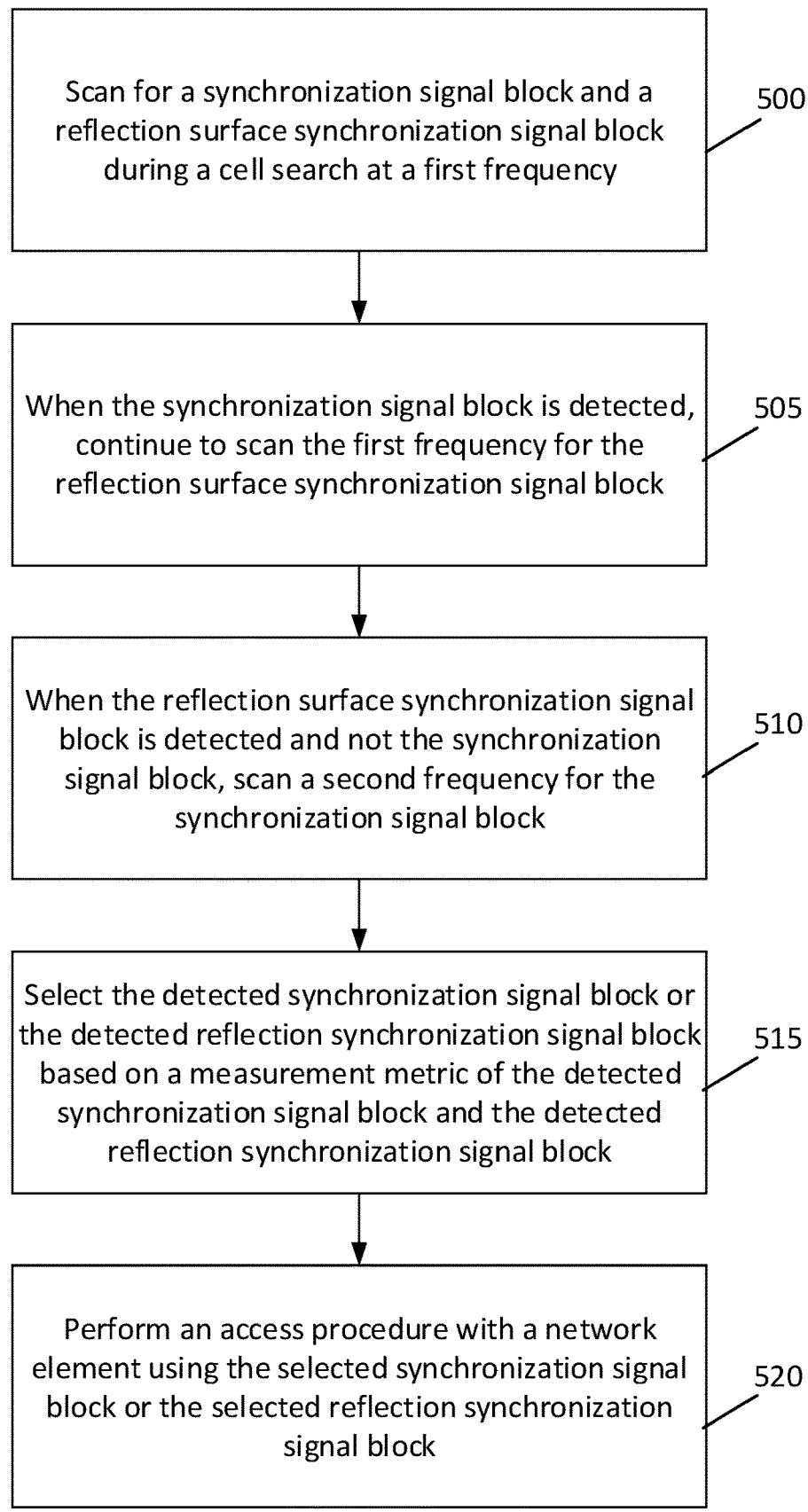
FIG. 13 illustrates an example flow diagram of another method, according to certain example embodiments.

FIG. 13 illustrates an example flow diagram of another method, according to certain example embodiments. In an example embodiment, the method of FIG. 13 may be performed by a network entity, network node, or a group of multiple network elements in a 3GPP system, such as LTE or 5G-NR. For instance, in an example embodiment, the method of FIG. 13 may be performed by a UE, for instance, similar to apparatus 10 illustrated in FIG. 15(a).

According to certain example embodiments, the method of FIG. 13 may include, at 500, scanning for a synchronization signal block and a reflection surface synchronization signal block during a cell search at a first frequency. At 505, the method may include, when the synchronization signal block is detected, continue scanning the first frequency for the reflection surface synchronization signal block. At 510, the method may include, when the reflection surface synchronization signal block is detected and not the synchronization signal block, scanning a second frequency for the synchronization signal block. At 515, the method may include selecting the detected synchronization signal block or the detected reflection synchronization signal block based on a measurement metric of the detected synchronization signal block and the detected reflection synchronization signal block. At 520, the method may include performing an access procedure with a network element using the selected synchronization signal block or the selected reflection synchronization signal block.

According to certain example embodiments, the method may also include acquiring at least partial system information to obtain details of a synchronization signal block configuration and a reflection surface synchronization signal block configuration. According to other example embodiments, the measurement metric of the detected synchronization signal block and the detected reflection synchronization signal block may include a reference signal received power or a signal to interference plus noise ratio. According to some example embodiments, the access procedure may be performed using a random access channel occasion corresponding to the selected synchronization signal block or the reflection synchronization signal block. In certain example embodiments, the method may also include reporting a capability of the apparatus to the network element utilizing a reflection surface.

Figure 14:
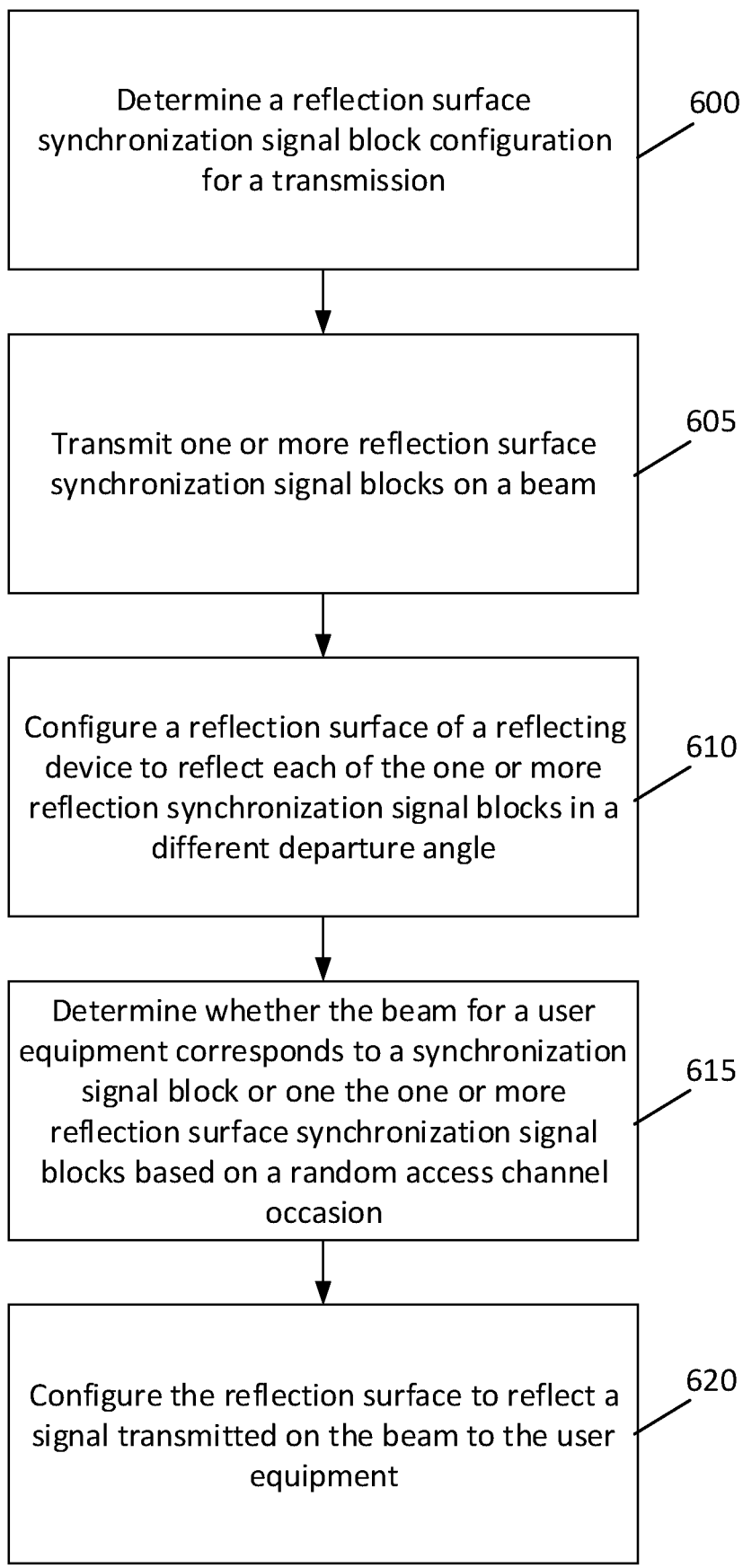
FIG. 14 illustrates an example flow diagram of a further method, according to certain example embodiments.

FIG. 14 illustrates an example flow diagram of another method, according to certain example embodiments. In an example embodiment, the method of FIG. 14 may be performed by a network entity, network node, or a group of multiple network elements in a 3GPP system, such as LTE or 5G-NR. For instance, in an example embodiment, the method of FIG. 14 may be performed by a BS or gNB, for instance, similar to apparatus 20 illustrated in FIG. 15(*b*).

According to certain example embodiments, the method of FIG. 14 may include, at 600, determining a reflection surface synchronization signal block configuration for a transmission. At 605, the method may include transmitting one or more reflection surface synchronization signal blocks on a beam. At 610, the method may include configuring the reflection surface to reflect each of the one or more reflection synchronization signal blocks in a different departure angle. At 615, the method may include determining whether the beam for a user equipment corresponds to a synchronization signal block or one of the one or more reflection surface synchronization signal blocks based on a random access channel occasion. At 620, the method may include configuring a reflection surface to reflect a signal transmitted on the beam to the user equipment.

According to certain example embodiments, all of the one or more reflection surface synchronization signal blocks may be transmitted in a different time or frequency location relative to a synchronization signal block burst set. According to other example embodiments, the method may also include, during transmission of the one or more reflection surface synchronization signal blocks, configuring the reflection surface to sweep over a pre-determined set of departure angles. According to some example embodiments, the method may include configuring phase shifts at the reflection surface for different departure angles.

In certain example embodiments, the method may further include configuring a periodicity of the one or more reflection surface synchronization signal blocks. In some example embodiments, the method may also include defining a predetermined number of the one or more reflection surface synchronization signal blocks based on one or more or user equipment complexity, a number of distinct departure angles, and a resolution of a phase control in reflecting elements of the reflection surface. In other example embodiments, the method may further include enabling or disabling support for the reflection surface during the transmission of the one or more reflection surface synchronization signal blocks. According to certain example embodiments, an actual number of the one or more reflection surface synchronization signal blocks transmitted may be less than a predefined number of the one or more reflection surface synchronization signal blocks. According to other example embodiments, the method may also include determining the actual number based on an angular range for reflections from the reflecting surface or a resolution of a phase control in reflecting elements of the reflection surface.

In certain example embodiments, the method may also include enabling or disabling support for the reflection surface during the transmission of the one or more reflection surface synchronization signal blocks. In other example embodiments, an actual number of the one or more reflection surface synchronization signal blocks transmitted may be less than a predefined number of the one or more reflection surface synchronization signal blocks. In some example embodiments, the method may further include determining the actual number based on an angular range for reflections from the reflecting surface or a resolution of a phase control in reflecting elements of the reflection surface.

FIG. 15(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 15(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 15(*a*).

As illustrated in the example of FIG. 15(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 15(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-13.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-13.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to scan for synchronization signal blocks and reflection surface synchronization signal blocks during a cell search at a frequency on a synchronization raster. Apparatus 10 may also be controlled by memory 14 and processor 12 to determine whether a synchronization signal block or a reflection surface synchronization signal block is detected as a result of the scanning. Apparatus 10 may further be controlled by memory 14 and processor 12 to select a detected synchronization signal block or a detected reflection synchronization signal block based on a measurement metric of the detected synchronization signal block and the detected reflection synchronization signal block. In addition, apparatus 10 may be controlled by memory 14 and processor 12 to perform an access procedure with a network element using the selected synchronization signal block or the selected reflection synchronization signal block.

In other example embodiments, apparatus 10 may be controlled by memory 14 and processor 12 to scan for a synchronization signal block and a reflection surface synchronization signal block during a cell search at a first frequency. Apparatus 10 may also be controlled by memory 14 and processor 12 to, when the synchronization signal block is detected, continue to scan the first frequency for the reflection surface synchronization signal block. Apparatus 10 may further be controlled by memory 14 and processor 12 to, when the reflection surface synchronization signal block is detected and not the synchronization signal block, scan a second frequency for the synchronization signal block. In addition, apparatus 10 may be controlled by memory 14 and processor 12 to select the detected synchronization signal block or the detected reflection synchronization signal block based on a measurement metric of the detected synchronization signal block and the detected reflection synchronization signal block. Further, apparatus 10 may be controlled by memory 14 and processor 12 to perform an access procedure with a network element using the selected synchronization signal block or the selected reflection synchronization signal block.

Figure 15B:
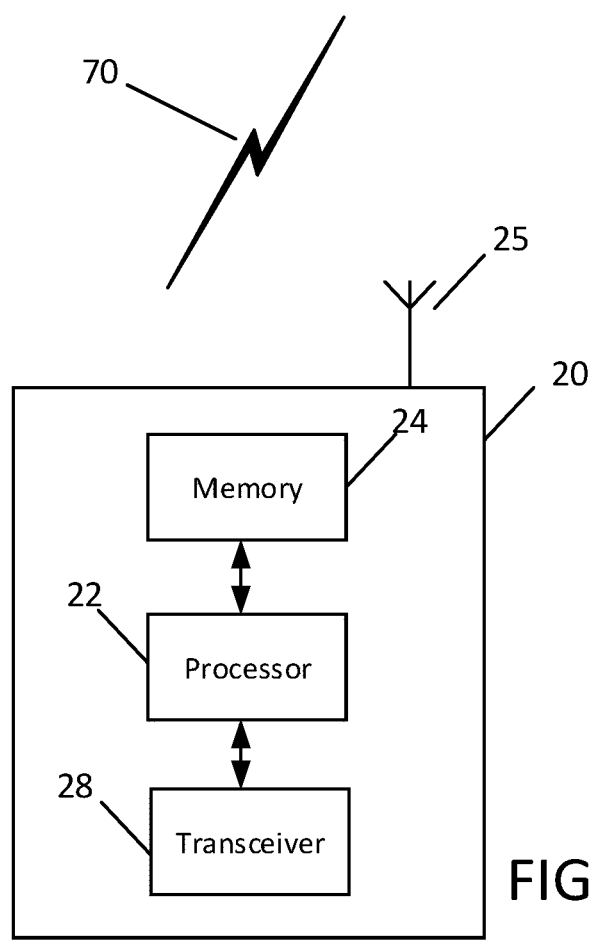
FIG. 15(b) illustrates another apparatus, according to certain example embodiments.

FIG. 15(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, BS, and/or WLAN access point, associated with a radio access network (RAN), such as an LTE network, 5G or NR. It should be noted that one of ordinary skill in the art would understand that apparatus 20 may include components or features not shown in FIG. 15(b).

As illustrated in the example of FIG. 15(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 15(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-11 and 14.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-11 and 14.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to determine a reflection surface synchronization signal block configuration for a transmission. Apparatus 20 may also be controlled by memory 24 and processor 22 to transmit one or more reflection surface synchronization signal blocks on a beam. Apparatus 20 may further be controlled by memory 24 and processor 22 to configure a reflection surface of a reflecting surface device to reflect each of the one or more reflection synchronization signal blocks in a different departure angle. In addition, apparatus 20 may be controlled by memory 24 and processor 22 to determine whether the beam for a user equipment corresponds to a synchronization signal block or one of the one or more reflection surface synchronization signal blocks based on a random access channel occasion. Further, apparatus 20 may be controlled by memory 24 and processor 22 to configure the reflection surface to reflect a signal transmitted on the beam to the user equipment.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations Certain example embodiments may be directed to an apparatus that includes means for performing any of the methods described herein including, for example, means for scanning for synchronization signal blocks and reflection surface synchronization signal blocks during a cell search at a frequency on a synchronization raster. The apparatus may also include means for determining whether a synchronization signal block or a reflection surface synchronization signal block is detected as a result of the scanning. The apparatus may further include means for selecting a detected synchronization signal block or a detected reflection synchronization signal block based on a measurement metric of the detected synchronization signal block and the detected reflection synchronization signal block. In addition, the apparatus may include mans for performing an access procedure with a network element using the selected synchronization signal block or the selected reflection synchronization signal block.

Other example embodiments may be directed to an apparatus that includes means for scanning for a synchronization signal block and an reflection surface synchronization signal block during a cell search at a first frequency. The apparatus may also include means for, when the synchronization signal block is detected, continue scanning the first frequency for the reflection surface synchronization signal block. The apparatus may further include means for, when the reflection surface synchronization signal block is detected and not the synchronization signal block, scanning a second frequency for the synchronization signal block. In addition, the apparatus may include means for selecting the detected synchronization signal block or the detected reflection synchronization signal block based on a measurement metric of the detected synchronization signal block and the detected reflection synchronization signal block. Further, the apparatus may include means for performing an access procedure with a network element using the selected synchronization signal block or the selected reflection synchronization signal block.

Other example embodiments may be directed to an apparatus that includes means for determining a reflection surface synchronization signal block configuration for a transmission. The apparatus may also include means for transmitting one or more reflection surface synchronization signal blocks on a beam. The apparatus may further include means for a reflection surface of a reflecting surface device to reflect each of the one or more reflection synchronization signal blocks in a different departure angle. In addition, the apparatus may include means for determining whether the beam for a user equipment corresponds to a synchronization signal block or one of the one or more reflection surface synchronization signal blocks based on a random access channel occasion. Further, the apparatus may include means for configuring the reflection surface to reflect a signal transmitted on the beam to the user equipment.

Certain example embodiments described herein provide several technical improvements, enhancements, and/or advantages. The example embodiments may also enable the gNB to determine the best phase shift settings at the IRS for a user equipment to receive transmissions from the gNB that are reflected by the IRS. Certain example embodiments may further enable the network to tune the settings based on the deployment considerations and properties of the IRS. In some example embodiments, it may be possible to determine the best departure angles of reflected signals from the IRS towards the UE. Certain example embodiments may also utilize additional reference signals transmitted by the gNB to enable the UE to identify the best reflected beam. In doing so, certain example embodiments may maximize the power of the signals transmitted by the gNB, which are in turn received by the UE.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary:
3GPP 3rd Generation Partnership Project
5G 5th Generation
SGCN 5G Core Network
BS Base Station
CSI-RS Channel State Information Reference Signal
eNB Enhanced Node B
gNB 5G or Next Generation NodeB
IRS Intelligent Reflecting Surface
IRS-SSB IRS-Synchronization Signal Block
LTE Long Term Evolution
MIB Master Information Block
NR New Radio
PRACH Physical Random Access Channel
RA Random Access
RACH Random Access Channel
RE Reflecting Element
RF Radio Frequency
RO RACH Occasion
RRC Radio Resource Control
RS Reference Signal
RSRP Reference Signals Received Power
SIB System Information Block
SSB Synchronization Signal Block
UE User Equipment

We claim:

1. An apparatus, comprising:
   at least one processor; and
   at least one memory comprising computer program code,
   the at least one memory and the computer program code are configured, with the at least one processor, to cause the apparatus at least to
   scan for synchronization signal blocks and reflection surface synchronization signal blocks during a cell search at a frequency on a synchronization raster;
   determine whether a synchronization signal block or a reflection surface synchronization signal block is detected as a result of the scanning;
   select a detected synchronization signal block or a detected reflection surface synchronization signal block based on a measurement metric of the detected synchronization signal block and the detected reflection surface synchronization signal block; and
   perform an access procedure with a network element using the selected synchronization signal block or the selected reflection surface synchronization signal block.

2. The apparatus according to claim 1, wherein the measurement metric of the detected synchronization signal block and the detected reflection surface synchronization signal block comprises a reference signal received power or a signal to interference plus noise ratio.

3. The apparatus according to claim 1, wherein the access procedure is performed using a random access channel occasion corresponding to the selected synchronization signal block or the selected reflection surface synchronization signal block.

4. The apparatus according to claim 1, wherein the at least one memory and the computer program code are further configured, with the at least one processor, to cause the apparatus at least to:
   report a capability of the apparatus to the network element utilizing a reflection surface.

5. An apparatus, comprising:
   at least one processor; and
   at least one memory comprising computer program code,
   the at least one memory and the computer program code are configured, with the at least one processor, to cause the apparatus at least to
   scan for a synchronization signal block and a reflection surface synchronization signal block during a cell search at a first frequency;
   when the synchronization signal block is detected, continue to scan the first frequency for the reflection surface synchronization signal block;
   when the reflection surface synchronization signal block is detected and not the synchronization signal block, scan a second frequency for the synchronization signal block;
   select the detected synchronization signal block or the detected reflection surface synchronization signal block based on a measurement metric of the detected synchronization signal block and the detected reflection surface synchronization signal block; and
   perform an access procedure with a network element using the selected synchronization signal block or the selected reflection surface synchronization signal block.

6. The apparatus according to claim 5, wherein the at least one memory and the computer program code are further configured, with the at least one processor, to cause the apparatus at least to:
   acquire at least partial system information to obtain details of a synchronization signal block configuration and a reflection surface synchronization signal block configuration.

7. The apparatus according to claim 5, wherein the measurement metric of the detected synchronization signal block and the detected reflection surface synchronization signal block comprises a reference signal received power or a signal to interference plus noise ratio.

8. The apparatus according to claim 5, wherein the access procedure is performed using a random access channel occasion corresponding to the selected synchronization signal block or the selected reflection surface synchronization signal block.

9. The apparatus according to claim 5, wherein the at least one memory and the computer program code are further configured, with the at least one processor, to cause the apparatus at least to:
   report a capability of the apparatus to the network element utilizing a reflection surface.

10. An apparatus, comprising:
    at least one processor; and
    at least one memory comprising computer program code,
    the at least one memory and the computer program code are configured, with the at least one processor, to cause the apparatus at least to
    determine a reflection surface synchronization signal block configuration for a transmission;
    transmit one or more reflection surface synchronization signal blocks on a beam;

configure a reflection surface of a reflecting surface device to reflect each of the one or more reflection surface synchronization signal blocks in a different departure angle;

determine whether the beam for a user equipment corresponds to a synchronization signal block or one of the one or more reflection surface synchronization signal blocks based on a random access channel occasion; and configure the reflection surface to reflect a signal transmitted on the beam to the user equipment.

11. The apparatus according to claim 10, wherein all of the one or more reflection surface synchronization signal blocks are transmitted in a different time or frequency location relative to a synchronization signal block burst set.

12. The apparatus according to claim 10, wherein the at least one memory and the computer program code are further configured, with the at least one processor, to cause the apparatus at least to:

configure the reflection surface to sweep over a predetermined set of departure angles during transmission of a plurality of the one or more reflection surface synchronization signal blocks.

13. The apparatus according to claim 10, wherein the at least one memory and the computer program code are further configured, with the at least one processor, to cause the apparatus at least to:

configure phase shifts at the reflection surface for different departure angles.

14. The apparatus according to claim 10, wherein the at least one memory and the computer program code are further configured, with the at least one processor, to cause the apparatus at least to:

configure a periodicity of the one or more reflection surface synchronization signal blocks.

15. The apparatus according to claim 10, wherein the at least one memory and the computer program code are further configured, with the at least one processor, to cause the apparatus at least to:

define a predetermined number of the one or more reflection surface synchronization signal blocks based on one or more of user equipment complexity, a number of distinct departure angles, and a resolution of a phase control in reflecting elements of the reflection surface.

16. The apparatus according to claim 10, wherein the at least one memory and the computer program code are further configured, with the at least one processor, to cause the apparatus at least to:

enable or disable support for the reflection surface during the transmission of the one or more reflection surface synchronization signal blocks.

17. The apparatus according to claim 10, wherein an actual number of the one or more reflection surface synchronization signal blocks transmitted is less than a predefined number of the one or more reflection surface synchronization signal blocks, and wherein the at least one memory and the computer program code are further configured, with the at least one processor, to cause the apparatus at least to determine the actual number based on an angular range for reflections from the reflecting surface or a resolution of a phase control in reflecting elements of the reflection surface.

* * * * *